Oct. 8, 1963 — J. W. MYDELS ETAL — 3,106,252
REAR GAUGE WHEEL FOR TWO-WAY PLOWS
Filed Oct. 25, 1961 — 2 Sheets-Sheet 1

Inventors
John W. Mydels
Charles N. Hurt
by Howard B. Scheckman
Attorney

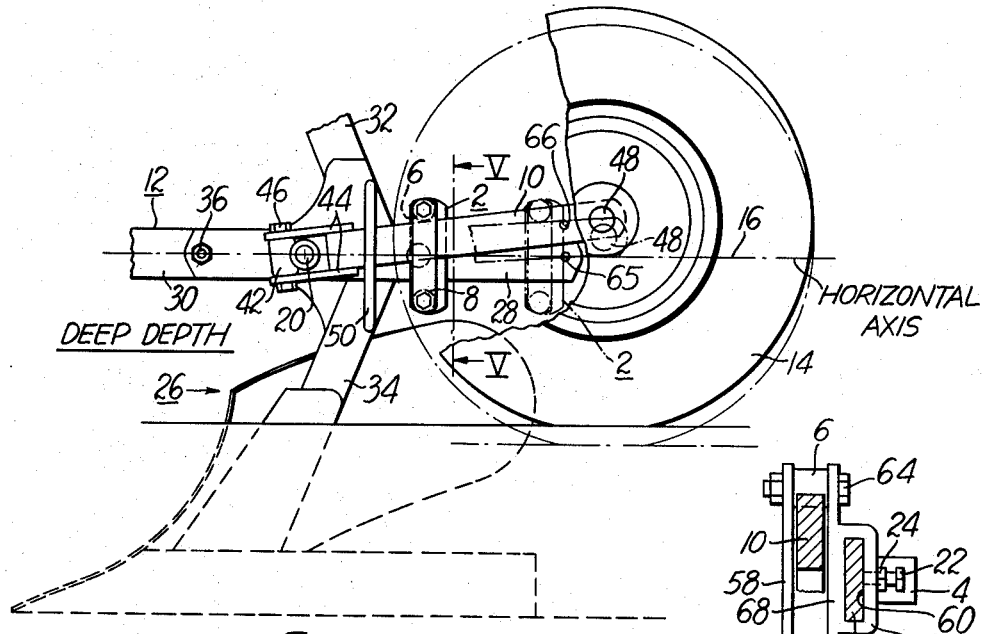
Fig. 4
Fig. 5
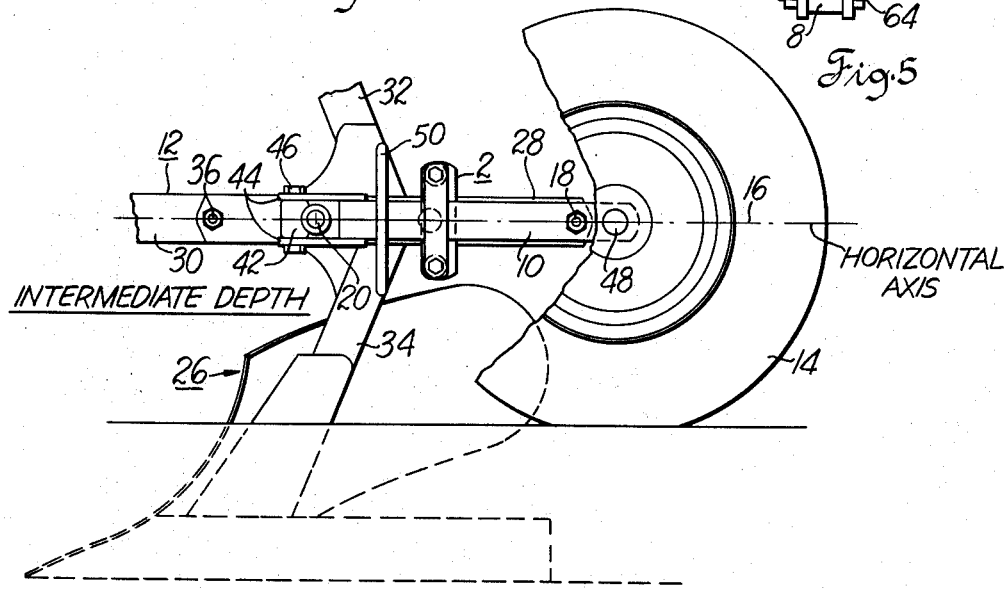
Fig. 6

# United States Patent Office 3,106,252
Patented Oct. 8, 1963

3,106,252
REAR GAUGE WHEEL FOR TWO-WAY PLOWS
John W. Mydels and Charles N. Hurt, La Crosse, Wis., assignors to Allis-Chalmers Manufacturing Company, Milwaukee, Wis.
Filed Oct. 25, 1961, Ser. No. 147,534
10 Claims. (Cl. 172—224)

This invention relates to agriculture and more particularly to a rear gauge wheel for a plow.

The basic idea of providing a rear gauge wheel to support a two-way plow in both of its operative positions is old. See for example the patent to Chandler U.S. 2,773,439.

However, there are certain problems involved when the same gauge wheel is used to gauge the depth of the plow in both of its operative positions.

One problem in previous gauge wheel constructions is that they do not have an easy way of adjusting the position of the gauge wheel.

Another problem in previous gauge wheel constructions is that they don't have a wide range of adjustment.

Another problem in previous gauge wheel constructions is that it is difficult to change the position of the gauge wheel by small increments to vary the depth of plowing.

It is an object of this invention to provide a rear gauge wheel that requres only one adjustment to simultaneously set the depth of the plows of both operative positions;

It is another object of this invention to provide a rear gauge wheel that can be set in a wide range of positions to permit plowing at either shallow, intermediate, or deep depths;

It is another object of this invention to provide a rear gauge wheel whose depth of operation can be changed by small increments to provide an infinite range of adjustment.

Other objects and advantages will appear from the following description in conjunction with the attached drawings, in which:

FIG. 4 is a side view, similar to FIG. 2 showing the rear gauge wheel in the deep plowing range, the gauge wheel is shown in a second position in the deep plowing range in dot-dash lines;

FIG. 5 is a section view of FIG. 4 taken in the direction of arrows V—V showing the position control means in the deep plowing position; and FIG. 6 is a side view of the plow and rear gauge wheel connected for intermediate depth plowing.

Invention Generally

Figure 1:
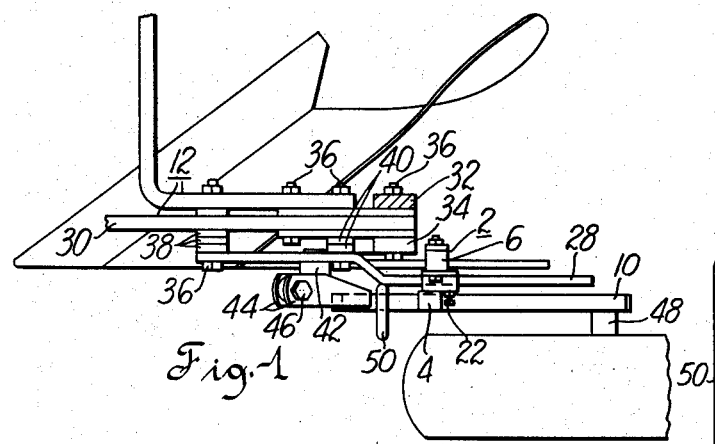
FIG. 1 is a plan view of a portion of a two-way plow and its rear gauge wheel.

The essence of this invention is to provide position control means 2 containing abutments 4, 6, 8 (FIG. 3) that can be selectively positioned relative to rear gauge wheel support 10 to limit its upward vertical movement.

Position control means 2 is also connected to move longitudinally along plow frame 12 to provide an infinite range of adjustment for gauge wheel 14.

Figure 3:
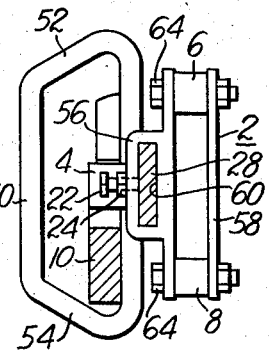
FIG. 3 is a sectional view of FIG. 2 taken in the direction of arrows III—III showing the position control means in the shallow plowing position.
Figure 2:
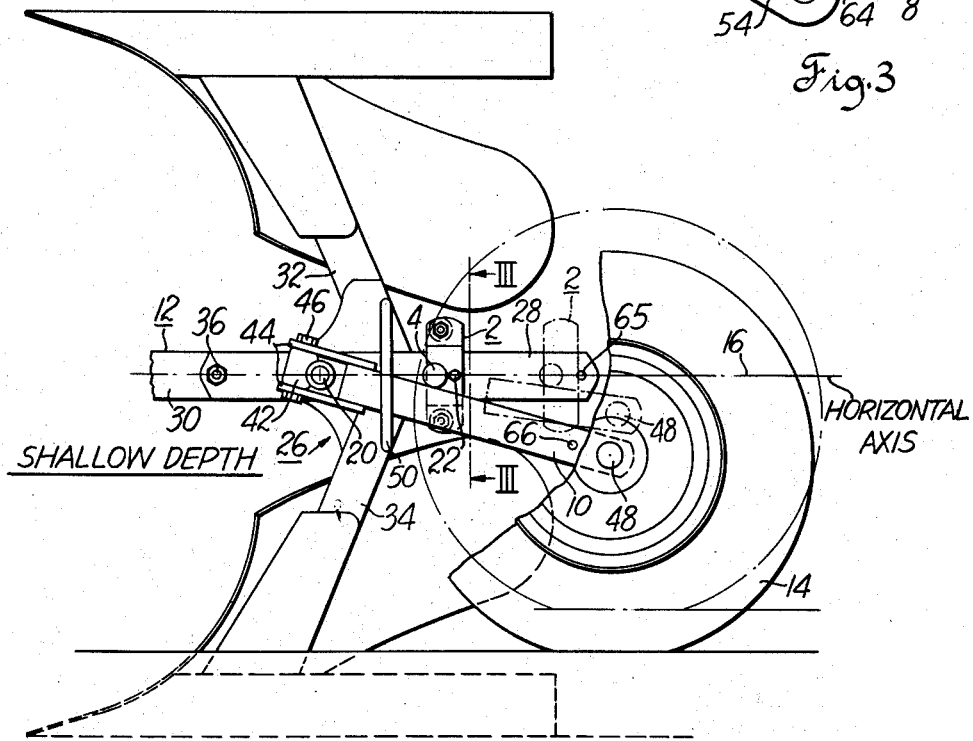
FIG. 2 is a side view of FIG. 1 showing the position of the rear gauge wheel in the shallow plowing range; the gauge wheel is shown in a second position in the shallow plowing range in dot-dash lines.

For shallow plowing, shown in FIGS. 2 and 3, abutment 4 is positioned to engage support 10 to limit the depth of plowing. Abutment 4 is located on horizontal axis 16, and serves as a stop for support 10 when the plow is rotated to either of its operative positions. It will be noted that only a single abutment 4 is used in this condition.

For deep plowing, shown in FIGS. 4 and 5, abutments 6 and 8 are positioned to straddle support 10 and limit the depth of plowing. Abutments 6 and 8 are located the same distance above and below horizontal axis 16. In the position shown, support 10 engages upper abutment 6.

For intermediate depth plowing, shown in FIG. 6, support 10 of rear gauge wheel 14 is fixed to plow frame 12 by bolt 18.

To obtain fine vertical adjustment of support 10 when in the shallow and deep depth plowing ranges, position control means 2 is moved longitudinal of plow frame 12 toward or from pivot bolt 20. The distance support 10 can pivot will be determined by the location of position control means 2 relative to pivot bolt 20.

Position control means 2 is locked in place by clamp means in the form of set screw 22 and jam nut 24.

Invention Specifically

Referring to the figures there is disclosed a portion of a two-way plow 26 having a plow carrying frame 12. The frame is supported for rotation on a horizontal axis 6 from one operative position on one side (FIG. 1) to a second operative position (not shown). This is well known in the art. Gauge wheel 14 is carried on plow frame 12.

Plow Frame

The plow frame includes a part 28 that is secured to main plow frame member 30 adjacent rear stub beams 32 and 34. The parts are interconnected by means of bolts 36. Part 28 is spaced from main plow frame member 30 by means of spacer blocks 38 and 40. Part 28 is offset outwardly, and has a free end for reception of position control means 2.

Gauge Wheel

Gauge wheel 14 is connected to plow frame 12 for universal movement, by means in the form of pivot member 42, bolt 20, and bolt 46.

Pivot member 42 is pivotally connected to plow frame part 28 by means of bolt 20. Pivot member 42 provides a pivotal support for forward bifurcated end 44 of support 10. Bifurcated end 44 is pivotally secured to pivot member 42 by pivot bolt 46.

Support 10 pivots about the axis of bolts 20 that is disposed transversely with respect to horizontal axis 16, and it also pivots about the axis of bolt 46 positioned at right angles to the axis of bolt 20. In other words, support 10 can swing vertically about the axis of bolt 20 and it can swing laterally about the axis of pivot bolt 46.

Gauge wheel 14 is supported on spindle 48 that is in turn supported by the rearward end of support 10.

The swinging movement of support 10 is confined within predetermined limits by means of rod member 50 rigidly fixed to part 28. Rod member 50 (FIG. 3) has cam portions 52, 54. They function to guide support 10 inwardly toward plow frame 12. When the plow is moved to its operative ground engaging position, support 10 will be relatively moved vertically to engage position control means 2.

Position Control Means

Position control means 2 limits the range of movement of the gauge wheel. The position control means is made up of a housing 56, abutments 4, 6, 8 and means in the form of plate 58 to guide support 10.

Housing 56 contains a socket 60 to slidably receive the free end of part 28 for longitudinal movement along said plow frame toward and from pivot member 20.

Abutment 4 is circular and is fixed to one surface of housing 56. Abutment 4 (FIG. 2) is positioned in a horizontal plane that intersects horizontal axis 16 and projects outwardly (FIG. 1) into the path of movement of support 10.

Second and third abutments 6 and 8 are fixed to the opposite surface of housing 56. Abutments 6 and 8 are spaced apart the same distance above and below horizontal axis 16 and are adapted to receive support 10 between them.

Clamp means are provided to detachably clamp housing 56 in either the pisition shown in FIG. 3 for shallow plowing, or the position shown in FIG. 5 for deep plowing. The clamp means are in the form of set screw 22 threaded into housing 56 and jam nut 24.

It will be noted that rod member 50 is ineffective when the plow is in the deep plowing position (FIGS. 4 and 5). That is, support 10 will engage either abutment 6 or 8 before it engages cam portion 52 or 54. In this condition, plate 58 serves the function of rod member 50 and operates to guide suport 10 when the plow rotates between its operative positions. Plate 58 is connected to housing 56 by bolts 64, 64.

Clamp means 22, 24 also operates to fix housing 56 in an infinite number of positions along plow frame part 28, to provide infinite vertical adjustment of support 10 relative to plow frame 12.

*Operation*

Position control means 2 cooperates with support 10 to provide a wide range of depth adjustment for gauge wheel 14.

For shallow plowing (FIG. 2), position control means 2 is located with abutment 4 in the path of movement of support 10. Abutment 4 can be moved longitudinally along plow frame part 28 toward and from pivot bolt 20. This varies the range of movement of support 10 and thereby control the position of gauge wheel 14 relative to plow frame 12. This in turn controls the depth of plowing. In FIG. 2, position control means 2 is shown in a second position in dot-dash lines to illustrate the corresponding change in position of rear gauge wheel 14.

For intermediate depth plowing (FIG. 6), gauge wheel 14 is fixed relative to plow frame 12. Means in the form of bolt 18 is received in aligned openings 65, 66 (FIG. 2) to fix support 10 relative to plow frame part 28. In this position spindle 48 is located in a horizontal plane that intersects horizontal axis 16 of plow frame 12. The gauge wheel in this position will gauge the same depth for both operative positions of the plow. Bolt 18 disables pivot connections 20, 46 to maintain support 10 in fixed position relative to plow frame 12. When support 10 is moved to the intermediate depth position in which it is shown in FIG. 6, position control means 2 can remain on frame part 28 so wall 68 (FIG. 5) will serve as a spacer between part 28 and support 10 to provide a more rigid connection.

When deep plowing, position control means 2 is located so support 10 is received between plate 58 and wall 68, with abutments 6 and 8 acting as depth limit stops. Position control means 2 can also be adjusted along plow frame part 2 to provide infinite adjustment of the plowing depth. It will be noted that in the deep plowing position, support 10 engages upon abutment 6 when the plow is in operative position. When rotating the plow between operative positons, plate 58 serves as the means to guide support 10. In FIG. 4 position control means 2 is shown in a second position in dot-dash lines, to illustrate the corresponding change in position of rear gauge wheel 14. It will be noted that as position control means 2 moves away from pivot bolt 20, the depth of plowing decreases. On the other hand referring to FIG. 2 it will be seen that as position control means 2 moves away from pivot bolt 20, the depth of plowing will increase.

In general terms, the herein disclosed two-way plow has a pivoted gauge wheel supporting arm, as represented by the arm 10, which is swingable from one gauging position to another upon reversal of the plow about a fore and aft extending pivot axis as indicated by the line 16. A bracket structure presenting a laterally projecting abutment in the path of vertical swinging movement of the gauge wheel supporting arm is mounted on a fore and aft extending bar member of the plow frame in longitudinally adjustable relation thereto. In the illustrated embodiment of the invention such bracket structure is afforded by the housing 56 and comprises a center portion adapted for reversible, longitudinally adjustable mounting on the fore and aft extending bar member 28. A first abutment portion 4 extends laterally outward from the center portion, at one side and substantially midway between the top and bottom ends of said bracket structure; and second and third abutment portions 6 and 8 extend laterally outward at the other side and adjacent to said top and bottom ends, respectively, of the bracket structure. Releasable fastening means are provided for securing the bracket structure 56 against displacement from any selected position of longitudinal adjustment thereof on the plow frame. In the illustrated embodiment of the invention such releasable fastening means comprise a clamping element, as represented by the set screw 22 (FIG. 3), which reacts between the bracket structure 56 and the frame bar 28. Further, means are carried on the plow frame and are cooperable with the gauge wheel supporting arm for guiding the latter from one of its gauging positions to the other, and vice versa, upon reversal of the plow about its pivot axis. Such means are afforded in the illustrated embodiment of the invention by either the rod 50 or by the plate 58, depending on whether the bracket or housing structure 56 is positioned on the frame bar 28 as shown in FIG. 3, or whether its position on the frame bar 28 is reversed as shown in FIG. 5. The gauge wheel supporting arm 10 may be secured rigidly against swinging movement about the transverse pivot bolt 20 and vertical pivot bolt 46 from a position midway between its mentioned gauging positions by detachable fastening means such as shown at 18 in FIG. 6.

Although a single embodiment of the present invention has been illustrated and described, it will be apparent to one skilled in the art that various changes and modifications may be made therein without departing from the invention or from the scope of the appended claims.

What is claimed is:

1. In a two-way plow having a plow carrying frame supported for rotation on a substantially horizontal axis from a first operative position on one side to a second operative position on on the other side, a ground contacting wheel structure comprising: a wheel; a support for said wheel; means connecting said support to said frame for universal movement; a housing connected to said plow frame for longitudinal movement along said plow frame; an abutment carried by said housing and positioned in the same horizontal plane as said horizontal axis; means operatively associated with said plow frame and said support for said wheel so as to guide said support to a position where it will move vertically when said plow moves into operative position; said abutment being constructed to engage said support and limit said support's vertical movement relative to said plow frame in both operative positions; and means operatively associated with said plow frame and said housing so as to fix said abutment in selected positions along said plow frame to provide vertical adjustment of said support relative to said plow frame.

2. In a two-way plow having a plow carrying frame supported for rotation on a substantially horizontal axis from a first operative position on one side to a second operative position on the other side, a ground contacting wheel structure comprising: a wheel; a spindle for said wheel; a support for said spindle; means connecting said support to said frame so as to pivot about an axis disposed transversely with respect to a horizontal axis; position control means connected to said plow frame for longitudinal movement along said plow frame; said position control means including vertically spaced abutments positioned to receive said support between them to limit said support's vertical movement relative to said plow frame in both operative positions; and means operatively associated with said plow frame and said position control means so as to fix said position control means in an infinite number of positions along said plow frame to provide infinite vertical adjustment of said support in both operative positions relative to said plow frame.

3. A device as set forth in claim 2 wherein said support engages the upper abutment of said vertically spaced abutments when said frame is in either operative position.

4. A device as set forth in claim 2 wherein said abutments are constructed to position said support with said spindle of said wheel vertically above the horizontal axis of said plow frame when said frame is in either operative position.

5. In a two-way plow having a plow carrying frame including an extension supported for rotation on a substantially horizontal axis from a first operative position on one side to a second operative position on the other side, a ground contacting wheel structure comprising: a wheel; a spindle for said wheel; a support for said spindle; means connecting said support to one side of said frame so as to pivot about a first axis disposed transversely with respect to a horizontal axis and on a second axis at right angles to said first axis; means operatively associated with said plow frame and said support so as to guide said support to a position where it will move vertically when said plow moves into the operative position; a housing containing a socket to slidably receive said plow frame for longitudinal movement along said frame; a first abutment fixed to one surface of said housing; said first abutment being positioned in a horizontal plane that intersects said horizontal axis and is in the path of movement of said support; second and third abutments fixed to the opposite surface of said housing, said second and third abutments being spaced apart the same distance above and below said horizontal axis and adapted to receive said support between said second and third abutments; clamp means carried by said housing to detachably clamp said housing in either of two positions to change the range of plowing depth of said plow, in a first position with said first abutment in the path of said support to engage said support and limit its vertical movement relative to said plow frame, or in a second position with said second and third abutments straddling said support with the upper of said abutments engaging said support to limit its vertical movement relative to said plow frame; said clamp means being operable to fix said housing in an infinite number of positions along said plow frame to provide infinite vertical adjustment of said support relative to said plow frame; and, means operatively associated with said plow frame and said support so as to fix said support relative to said plow frame when said spindle is in a horizontal plane that intersects the horizontal axis of said plow frame, to disable said pivot connections to maintain said support in fixed position relative to said plow frame for intermediate depth plowing.

6. In a two-way plow of the type wherein a pivoted gauge wheel supporting arm is swingable from one gauging position to another upon reversal of the plow about a fore and aft extending pivot axis, the combination of a plow frame, pivot means mounting said gauge wheel supporting arm on said plow frame in universally swingable relation thereto, a bracket structure mounted on said plow frame in fore and aft adjustable relation thereto and presenting a laterally projecting abutment in the path of vertical swinging movement of said supporting arm; releasable fastening means securing said bracket structure against displacement from any selected position of longitudinal adjustment thereof on said plow frame; and means carried on said plow frame and cooperable with said gauge wheel supporting arm for guiding the latter from said one gauging position into the other, and vice versa, upon said reversal of said plow about said pivot axis.

7. The combination set forth in claim 6, wherein said plow frame has a rigid fore and aft extending bar member; wherein said bracket structure is mounted on said bar member in longitudinally adjustable relation thereto; and wherein said releasable fastening means comprise a clamping element reacting between said bracket structure and said bar member.

8. The combination set forth in claim 7 and further comprising detachable fastening means cooperable with said fore and aft extending bar member and with said gauge wheel supporting arm for rigidly securing the latter against swinging about said pivot means from a position midway between said gauging positions.

9. The combination set forth in claim 7, wherein said bracket structure comprises a center portion adapted for reversible, longitudinally adjustable mounting on said fore and aft extending bar member; a first abutment portion extending laterally outward from said center portion at one side and substantially midway between the top and bottom ends of said bracket structure; and second and third abutment portions extending laterally outward at the other side and adjacent said top and bottom ends, respectively, of said bracket structure.

10. The combination set forth in claim 9 and further comprising an elongated plate member, and detachable fastening means securing said plate member at its opposite ends to said second and third abutment portions, respectively, of said bracket structure.

References Cited in the file of this patent

UNITED STATES PATENTS

| | | |
|---|---|---|
| 2,842,038 | Chandler | July 8, 1958 |
| 2,921,639 | Welch | Jan. 19, 1960 |
| 2,959,232 | Gordon | Nov. 8, 1960 |
| 3,013,618 | Zeltwanger | Dec. 19, 1961 |

FOREIGN PATENTS

| | | |
|---|---|---|
| 184,760 | Austria | Feb. 25, 1956 |